Feb. 18, 1969  R. E. GAGNON  3,428,000
PASTRY FILLING MACHINE
Filed Dec. 12, 1966  Sheet 1 of 2

INVENTOR
ROBERT E. GAGNON
BY
Featherstonhaugh & Co.
ATTORNEYS

United States Patent Office 3,428,000
Patented Feb. 18, 1969

3,428,000
PASTRY FILLING MACHINE
Robert E. Gagnon, 1367 W. 50th Ave., Vancouver,
British Columbia, Canada
Filed Dec. 12, 1966, Ser. No. 600,877
U.S. Cl. 107—1
Int. Cl. A23g 3/20
2 Claims

ABSTRACT OF THE DISCLOSURE

A machine having a conveyor for moving articles past mechanism adapted to impale each article in turn and inject a predetermined amount of filling material into said article. Controlling means for operating the mechanism automatically through an impaling stroke and a retraction stroke with the operation being initiated by the article contacting a starting member of the controlling means.

---

This invention relates generally to machines for injecting pastries with cream or other filling material.

There are a number of machines presently in use for this purpose, but such equipment is often found to be a bottleneck in a modern bakery which is striving for maximum automation. Some machines, for example, are not fully automatic so that at one stage of the filling operation the pastry articles are required to be handled. From a sanitary standpoint, this is not desirable but more important still it inevitably results in as lowing of production. Other filling devices do not have full control over the amount of filling material which is dispensed and as a result some of the articles are overfilled while others are underfilled. When a machine which does not have ful control over the dispensing action has been in operation for a short time, it is usually found that surplus filling material will build up around the dispensing nozzle as well as adjoining parts of the machine. This reduces the effectiveness of the machine so that it frequently becomes necessary to shut it down for purposes of cleaning and this all contributes to a decrease in productivity of the bakery.

The present invention overcomes the above and other disadvantages of conventional machines by providing an improved and fully automatic pastry filling machine. The machine contemplated has a conveyor which receives the articles from, say, the oven and delivers them to other devices for whatever further processing is required. At some suitable station on the machine and bordering the conveyor, the filling mechanism is mounted. The mechanism is provided with a starting member which is tripped by each article in turn as the article moves past the station. When actuated by the starting member, the mechanism commences its cycle of operation to impale the tripping article, inject it with the filler and release the article, whereupon the mechanism is ready to start the next cycle. Means are provided to ensure that the quantity of filler dispensed during each cycle of operation is precisely controlled. Other means are provided to keep the filling material as much as possible within a closed circuit so that the machine is not smeared with material to the same extent as would otherwise be the case nor is it clogged with particles of the pastries being filled. The machine generally is economical to manufacture and operate, and is designed to operate continuously over extended periods with little or no maintenance.

Figure 1:
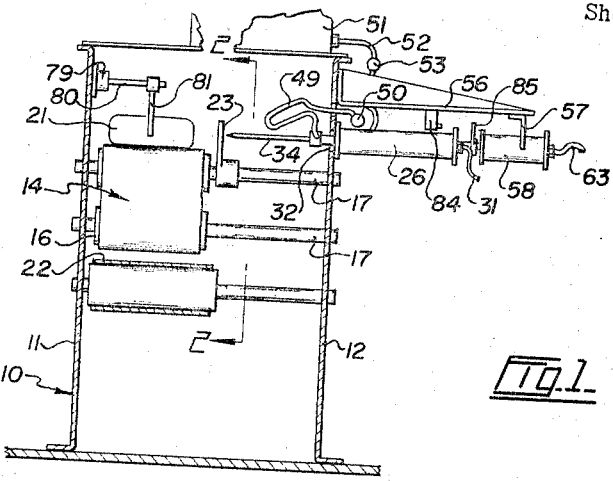
Figure 2:
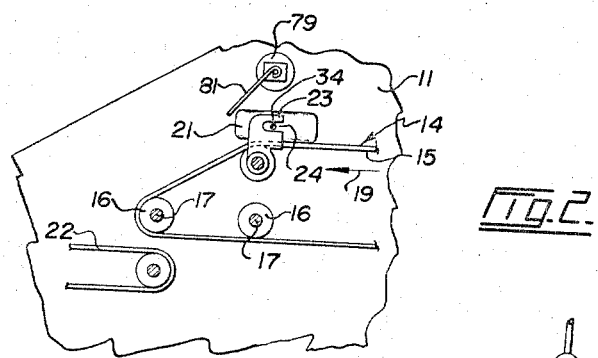
Figure 3:
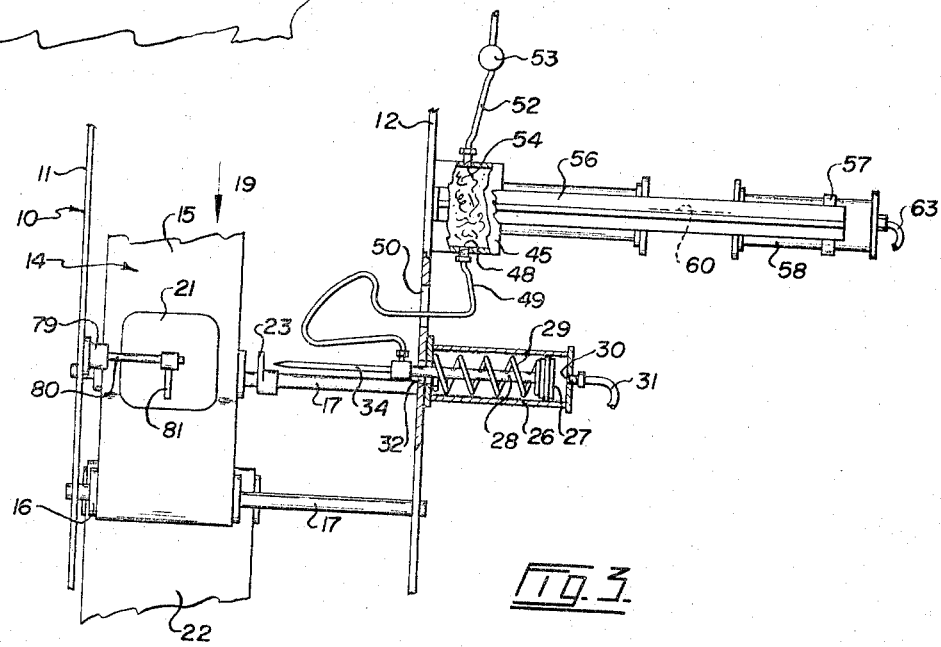
Figure 4:
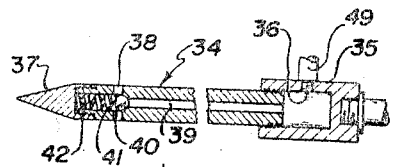
Figure 5:
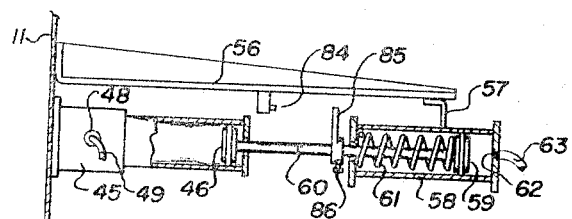
Figure 6:
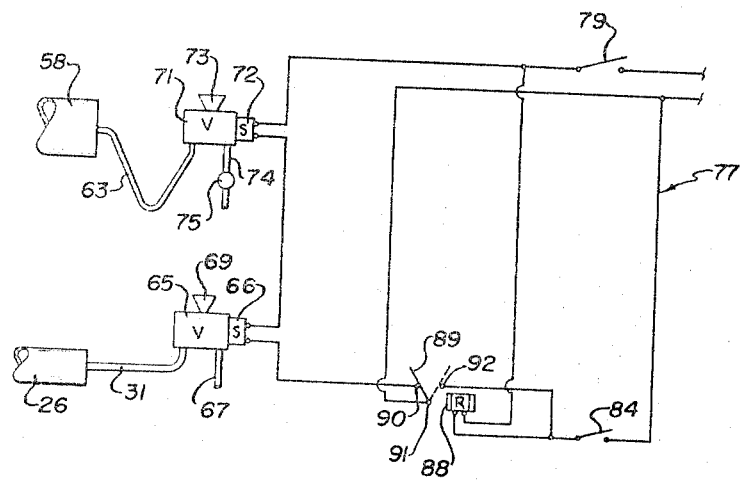

In the drawings:
FIGURE 1 is an end elevation, partly in section, of the pastry filling machine,
FIGURE 2 is a section taken on the line 2—2 of FIGURE 1,
FIGURE 3 is an enlarged fragmentary plan of the machine with parts being shown in section,
FIGURE 4 is a detail section of the injection needle with parts broken away,
FIGURE 5 is a side elevation of the pump and associated parts, partially sectioned, and
FIGURE 6 is a diagram showing the electrical and pneumatic circuits for controlling the device.

One example of the use to which the present invention may be put is the filling of doughnuts with jelly. The machine will be described as used for this purpose, but it will be understood the device will serve equally as well for injecting other food products with a fluid-like filter.

Referring to the drawings, the numeral 10 indicates a frame having sides 11 and 12. The frame 10 supports a horizontal conveyor 14. As shown here, the conveyor 14 consists of an endless belt 15 which is trained over idler rollers 16, the rollers being journalled on shafts 17 which are carried by the frame sides 11 and 12. The right end of the conveyor 14, as viewed in FIGURE 2, is suitably driven to move the top run of the conveyor belt in the direction of arrow 19. Doughnuts 21, or other pastry articles, are deposited on the driven end of the conveyor in spaced relation and are advanced to the left or to the discharge end of the conveyor illustrated in FIGURE 2. The doughnuts drop off the left end of the conveyor on to a second conveyor 22 which carries them away for further processing or packaging. One of the shafts 17 is fitted with an extractor plate 23 which projects upwardly above the level of belt 15. The plate 23 has a central opening 24 which can be either a slot or hole.

Secured to the side 12 at the left end of the frame, is an air cylinder 26 having a piston 27 and a rod 28. A spring 29 encloses the rod 28 to resist inward movement of the piston 27. The outer end of the cylinder 26 has an inlet-outlet port 30 to which a hose 31 is connected.

The piston rod 28 projects through an opening 32 in the side 12 and is fitted with a needle 34 which registers with the opening 24 in the extractor plate 23. As best shown in FIGURE 4, the injection needle 34 is provided with a tubular fitting 35 in which an inlet opening 36 is formed. The needle is provided, near its sharpened end or tip 37, with a transversely extending discharge passage 38, and the bore 39 of said needle connects this passage with the opening 36. A valve seat 40 is formed at the junction of the passage 38 and the bore 39, and a ball check valve 41 normally is held against this seat by means of a spring 42.

Near the cylinder 26, the side 12 of the frame supports a pump 45 which is fitted with a plunger 46. The pump 45 has a discharge port 48 which is connected to the opening 36 in the needle fitting 35, by means of a flexible hose 49, the hose extending freely through an opening 50 in the side 12 of the frame. A jelly reservoir 51, see FIGURE 1 only, is mounted on a suitable part of the frame 10 and a hose 52, fitted with a one way valve 53, connects said reservoir with an inlet port 54 on the pump 45.

A bracket 56 is secured to the side 12 of the frame above the pump 45. A strap 57 is carried at the free end of the bracket 56 and supported by this strap in alignment with the pump 45, is an air cylinder 58. The cylinder 58 is fitted with a piston 59 and a rod 60 connects said piston to the plunger 46 of the pump. A spring 61 is provided within the cylinder 58 to urge the piston and its connected parts towards the outer end of said cylinder. The cylinder 58 has an inlet-outlet port 62 to which a hose 63 is connected. When the plunger 46 is retracted by the spring 61, jelly is drawn from the reservoir 51 into the pump and, when the cylinder 58 is pressurized, the jelly is discharged through the hose 49 and the needle 34.

In FIGURE 6 it will be seen that the air supply hose 31 to cylinder 26 extends to a valve 65 which is operated by means of a solenoid 66. When the solenoid is energized, the valve 65 connects the hose 31 to a line 67 leading to a suitable source of air pressure, not shown. The valve 65, when in its normal closed position, connects the cylinder 26 to atmosphere through the line 31 and a vent 69. A similar valve 71, operated by a solenoid 72, is provided to control the flow of pressurized air to the cylinder 58. The valve 71 has a vent 73 and a line 74 to an air pressure source, also not shown. A suitable valve 75 is provided in the line 74 to delay the flow of operating air pressure to the cylinder 58.

The solenoids 66 and 72 form part of an electric circuit 77, see FIGURE 6. The circuit 77 includes a starter switch 79, this element being mounted on the side 11 of the frame as shown in FIGURES 1 and 2. The switch 79 has a spindle 80 to which a trigger 81 is secured, the trigger normally hanging vertically downwards approximately in line with the needle 34 and in the path of the doughnuts 21 being moved by the conveyor. Thus, the starter switch is closed when the trigger 81 and the spindle 80 are rocked by a passing doughnut and the solenoids 66 and 72 are both connected to the power source by the closing of said switch.

A limit switch 84 is also included in the circuit 77, the switch being mounted on the underside of the bracket arm 56, as shown best in FIGURE 6. The switch is closed when contacted by a finger 85 which is slidably mounted on the rod 60. An adjusting bolt 86 is fitted to the finger 85 and is adapted to engage the rod 60 and secure the finger to the rod in any selected position.

When the switch 84 is closed, a relay 88 in the circuit 77 is energized. The relay has an armature 89 which normally is closed across contacts 90 and 91. These contacts, when closed by the armature, complete the circuit between the solenoids 66 and 72 and the power source. Contact 92 of the relay 88 is connected in the circuit 77 to hold said relay energized until such time as switch 79 is reopened.

To operate the pastry filling machine, the finger 85 is first adjusted on the rod 60 so that the device will inject the required amount of jelly. The doughnuts 21 are then placed on the belt 15 of the continuously running conveyor and are moved towards the discharge end thereof as a row of closely spaced articles. As the first doughnut engages the trigger 81 and closes the switch 79, the solenoids 66 and 72 are energized to open the valves 65 and 71 and pressurize the cylinders 26 and 58. The cylinder 26 is charged with air immediately whereupon the needle 34 is thrust inwardly and the tip 37 is projected through the opening 24 of the extractor plate 23 and is embedded in the doughnut. By the time this action takes place, the delay action valve 75 has opened and the cylinder 58 has been pressurized sufficiently to start the jelly flowing from the pump 45. The check valve 41 is forced off its seat by the increasing pressure of the pumped material and the jelly is ejected through the passage 38 and into the centre of the doughnut.

When the finger 85 contacts and closes the switch 84, the relay 88 attracts the armature 89 to open contacts 90 and 91 and close contacts 91 and 92. This disconnects the solenoids 66 and 72 from the power source and halts the pump 45. Both cylinders 26 and 58 are then vented to atmosphere by their now closed valves 65 and 71. The spring 29 of the cylinder 26 moves the needle 34 through its retraction stroke and as this movement occurs the filled doughnut bears against the extractor plate 23 and thus is prevented from being drawn off the conveyor by the retracting needle.

The moment the filled doughnut is released by the needle, the conveyor moves the doughnut out of the way, to allow the trigger 81 to drop by gravity and reopen the starter switch 79. The plunger 46 of the pump now is moved endwise by the spring 61 whereupon the limit switch 84 is reopened, and a further charge of jelly is drawn from the reservoir into the pump body.

As previously mentioned, when switch 84 is closed, the relay 88 is energized and the circuit 77 is opened to bring the jelly pumping action to a halt. The needle 34 then retracts and the pump 45 executes its intake stroke. When the pump 45 starts its intake stroke, the switch 84 is reopened but the relay 88 remains energized as long as the switch 79 remains closed. As soon as the filled doughnut 21 is moved clear of the trigger 81, the starter switch 79 is opened to de-energize the relay 88 and complete one operating cycle of the machine.

Thus, as each doughnut in turn closes the switch 79, the machine executes one operating cycle and is readied for the next article on the conveyor. Each doughnut receives the selected quantity of jelly and the amount can readily be varied as required by a simple adjustment of the finger 85.

Switch 79 has been described as a simple mechanical switch, but it will be understood that other starter members may be used. For example, the invention contemplates the use of a light dependent resistor which would react to close the circuit 77 when a light beam was interrupted by a passing doughnut.

What I claim as my invention is:

1. A machine for injecting articles with filling material and comprising a frame, an article moving conveyor on the frame, a first fluid cylinder mounted on the frame and having a piston rod, a needle secured to the piston rod and having a bore and a discharge passage communicating with said bore, said first fluid cylinder being adapted to reciprocate the needle through an article impaling stroke and a retraction stroke, a pump mounted on the frame and being operatively connected to a source of filling material and to the bore of the needle, said pump having a plunger, a second fluid cylinder having a piston, means operatively connecting the second fluid cylinder piston to the pump plunger, said second fluid cylinder being adapted to operate the pump between the impaling stroke and the retraction stroke of the needle, controlling means for the first and second fluid cylinders, said controlling means including a fluid circuit and an electrical circuit, said fluid circuit having a valve for each of the fluid cylinders, said valves each having an operating solenoid included in the electrical circuit, a starter switch in the electrical circuit, said starter switch being adapted to be contacted by each article in turn as said article is moved by the conveyor into registration with the needle, whereby said article is impaled by the needle and injected with filling material, a limit switch included in the electrical circuit, said limit switch being mounted in close proximity to the means operatively connecting the pump plunger to the piston of the second fluid cylinder, a limit switch actuating finger slidably mounted on the aforesaid connecting means, and means for selectively positioning the finger to vary the amount of filling material injected into the article.

2. A machine as claimed in claim 1, in which said fluid circuit includes means for delaying the flow of operating air to the second fluid cylinder a suitable interval after operation of the first fluid cylinder.

References Cited

UNITED STATES PATENTS

| 2,490,765 | 12/1949 | Abbott. | |
|---|---|---|---|
| 2,580,755 | 1/1952 | Funk. | |
| 2,755,732 | 7/1956 | Sanderson | 99—257 |
| 3,081,691 | 3/1963 | Schmidt | 99—257 |

FOREIGN PATENTS

| 967,230 | 8/1964 | Great Britain. |
|---|---|---|
| 736,739 | 9/1955 | Great Britain. |

WALTER A. SCHEEL, *Primary Examiner.*

ARTHUR O. HENDERSON, *Assistant Examiner.*

U.S. Cl. X.R.

99—256